United States Patent
Wu (10) Patent No.: US 10,805,381 B2
(45) Date of Patent: Oct. 13, 2020

(54) WEB STORAGE BASED IOT DEVICE PROTECT MECHANISM

(71) Applicant: Citrix Systems, Inc., Fort Lauderdale, FL (US)

(72) Inventor: Hao Wu, Nanjing (CN)

(73) Assignee: Citrix Systems, Inc, Fort Lauderdale, FL (US)

( * ) Notice: Subject to any disclaimer, the term of this patent is extended or adjusted under 35 U.S.C. 154(b) by 290 days.

(21) Appl. No.: 15/723,939

(22) Filed: Oct. 3, 2017

(65) Prior Publication Data

US 2019/0104172 A1   Apr. 4, 2019

(51) Int. Cl.
| | |
|---|---|
| *H04L 29/08* | (2006.01) |
| *H04L 29/06* | (2006.01) |
| *G06F 9/4401* | (2018.01) |
| *H04W 12/06* | (2009.01) |
| *G06F 8/61* | (2018.01) |
| *H04W 4/70* | (2018.01) |

(52) U.S. Cl.
CPC ............... *H04L 67/10* (2013.01); *G06F 8/63* (2013.01); *G06F 9/4416* (2013.01); *H04L 63/08* (2013.01); *H04L 63/0807* (2013.01); *H04L 63/0823* (2013.01); *H04L 63/0876* (2013.01); *H04L 67/34* (2013.01); *H04W 4/70* (2018.02); *H04W 12/0609* (2019.01)

(58) Field of Classification Search
CPC ......... H04L 67/10; H04L 63/08; H04L 67/34; G06F 8/63; G06F 9/4416; H04W 4/70
See application file for complete search history.

(56) References Cited

U.S. PATENT DOCUMENTS

| | | | | |
|---|---|---|---|---|
| 2003/0018889 A1* | 1/2003 | Burnett | ............... | H04L 41/0809 713/153 |
| 2004/0163008 A1* | 8/2004 | Kim | ................... | H04L 67/1095 714/4.1 |
| 2006/0155837 A1* | 7/2006 | Kobayashi | .......... | H04L 67/1097 709/223 |
| 2007/0244987 A1* | 10/2007 | Pedersen | ................ | H04L 67/34 709/217 |
| 2013/0238687 A1* | 9/2013 | Yamashita | ............ | G06F 9/4416 709/203 |
| 2014/0325140 A1* | 10/2014 | Haug | ....................... | G06F 8/63 711/112 |
| 2016/0188307 A1* | 6/2016 | Reagan | ..................... | G06F 8/61 717/177 |
| 2017/0187808 A1* | 6/2017 | Redgate | ................ | H04L 67/125 |

* cited by examiner

*Primary Examiner* — Benjamin M Thieu
(74) *Attorney, Agent, or Firm* — Foley & Lardner LLP (57) ABSTRACT

Described embodiments provide systems and methods for provisioning disk images on remote devices. Described is a device configured to connect to a pre-configured network upon device start-up, transmit a request to a server at a pre-configured network address, receive a response containing a disk image for the device, and populate a memory component of the device with the disk image received. Described is a server configured to, responsive to receiving a request from a device, authenticate the request, identify a disk image corresponding to the device, and transmit the disk image to the device. These systems and methods are well suited for improving security and integrity of deployed special-purpose devices, e.g., as may be used for an "Internet of Things" deployment.

19 Claims, 6 Drawing Sheets

WEB STORAGE BASED IOT DEVICE PROTECT MECHANISM

BACKGROUND

Network accessible computing systems, e.g., servers in a data center, provide various services over a network (e.g., the Internet). These systems are sometimes referred to as "cloud based" or "in the cloud" in reference to their off-premises location within the network (which is often depicted in figures as a cloud). Cloud-based services may be hosted on servers owned or managed by a third-party, e.g., under a tenancy or co-tenancy arrangement. The third-party providing the hardware (or time on shared hardware) may be referred to as a cloud-services provider. Cloud-based services provide a variety of conveniences, including the ability to quickly provision new services, the ability to provide services and functionality to network-connected customers in a variety of contexts, and the ability to seamlessly migrate data between network-connected devices.

A variety of special-purpose devices have been developed that extend back-end server functionality into locations beyond the data center. These devices effectively extend the reach of network (or the cloud) into specific locations in close proximity to real world applications. Collections or networks of these devices ("things") are sometimes referred to as "the Internet of Things," or "IoT." IoT devices may be found deployed in a variety of contexts including farms, industrial centers (e.g., factories), commercial facilities (e.g., warehouses and retail stores), distribution lines, vehicles (e.g., delivery trucks, trains, cars, etc.), entertainment centers (e.g., movie theaters and amusement parks), office buildings, hotels and conference centers, and domestic home settings. Examples of IoT devices include, but are not limited to, environmental monitoring devices such as thermometers, smoke detectors, light detectors, motion detectors, and humidity detectors that provide environmental sensor data back to the servers via the network. Examples of IoT devices further include, but are not limited to, control devices such as thermostats, auditory or visual alarms, light switches, door locks, automatic doors, pet food dispensers, and other devices that can receive instructions or configurations from servers via the network.

IoT devices, once deployed, can be difficult to manage. Initially, software installed on the devices can only be upgraded using mechanisms implemented prior to distribution. Furthermore, the device may use an operating system and/or device drivers that may be difficult to modify once deployed. Security flaws and bugs in these systems may be difficult to quickly fix, and may be impossible to test once deployed.

IoT devices are typically intended to be simplified special-purpose devices. Additional components and hardware that are not necessary to the purpose of a given IoT device add cost and risk to the deployment of the IoT device. It can be beneficial to identify components that could be omitted from a device to reduce these costs and risks.

An IoT device that has been deployed may be accessed by third parties. The device, once deployed, may be physically controlled by a third party. The device may be using a third-party network for communication with the servers. The device may be compromised or physically accessed by malicious parties. Once an IoT device has been modified (or hacked), it may be difficult to detect that the device has been modified, it may be difficult to reverse the modifications, and it may result in a larger compromise. For example, a hacked IoT device on a network may introduce vulnerabilities to other devices on the network.

These and other technical problems are addressed by the subject matter described.

SUMMARY

This Summary is provided to introduce a selection of concepts in a simplified form that are further described below in the Detailed Description. This Summary is not intended to identify key features or essential features, nor is it intended to limit the scope of the claims included herewith.

Described embodiments provide systems and methods for protecting the integrity of computing devices, such as Internet of Things ("IoT") devices, by remotely provisioning disk images on the deployed devices. By remotely controlling all software managed behavior of the device, any flaws in a deployed device are automatically corrected. Any unauthorized modifications made to the software are removed simply by restarting the device. In some embodiments, the device is configured to periodically refresh the disk image, effectively forcing these restarts.

In at least one aspect, described is a system for provisioning disk images on remote devices. The system includes a device having a volatile memory component, a processor configured to execute instructions from the volatile memory component, and a network interface controller configured to connect to a pre-configured network upon device start-up, transmit a request to a server at a pre-configured network address, receive a response containing a disk image for the device, and populate the volatile memory component with the disk image received. The system further includes a server configured to, responsive to receiving the request from the device, authenticate the request, identify the disk image corresponding to the device, and transmit the disk image to the device.

In some embodiments, the system includes a data storage device storing one or more disk images for the remote devices. The server is configured to identify the disk image from the data storage device based on either a device identifier specific to the device or a device type corresponding to the device. In some embodiments, the device is configured to periodically request, from the server, a refresh of the disk image, receive a replacement disk image, and populate the volatile memory component with the replacement disk image received. Populating the volatile memory component with the replacement disk image replaces any previously received disk image.

In at least one aspect, described is a method of provisioning a disk image on a remote device. The method includes receiving, by a server from a device, a request for a disk image suitable for operation of the device. The method includes authenticating, by the server, the request, and identifying a disk image corresponding to the device. The method includes transmitting the identified disk image to the device responsive to the request.

In at least one aspect, described is a method of booting a device absent a device-local disk image. The method includes transmitting, by a device during an initialization or boot-up phase, to a pre-configured network address corresponding to a server, a request for a disk image suitable for operation of the device. The method includes receiving the disk image from the server and populating a memory element of the device with the received disk image, the disk image including operation code for the device. The method includes executing the operation code for the device, from disk image stored in the memory element of the device.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

The subject matter described covers topics that, among other things, enables a disk image for a device to be remotely provisioned from a server. By moving the disk image from the device to the server, the device no longer needs non-volatile memory and can be constructed with just volatile memory components if desired. On boot-up or initialization, the device requests the disk image from the server and populates its memory with the disk image. Although referred to throughout this document as a "disk" image, the disk image need not precisely correspond to a "disk," and in some embodiments is a device image that includes instructions for operation of the device. In some embodiments, the image includes a comprehensive set of instructions for operation of the device, i.e., everything needed to run the device other than the initialization processes described herein. The device receives and stores the disk image, and then runs from the stored disk image. In some embodiments, the device is further configured to periodically refresh the disk image. Because the disk image is managed at the server, a modification to the image at the device (e.g., by a hacker or other malicious user) will not persist past a re-start and will be removed periodically, e.g., in embodiments with a periodic refresh.

Figure 1A:
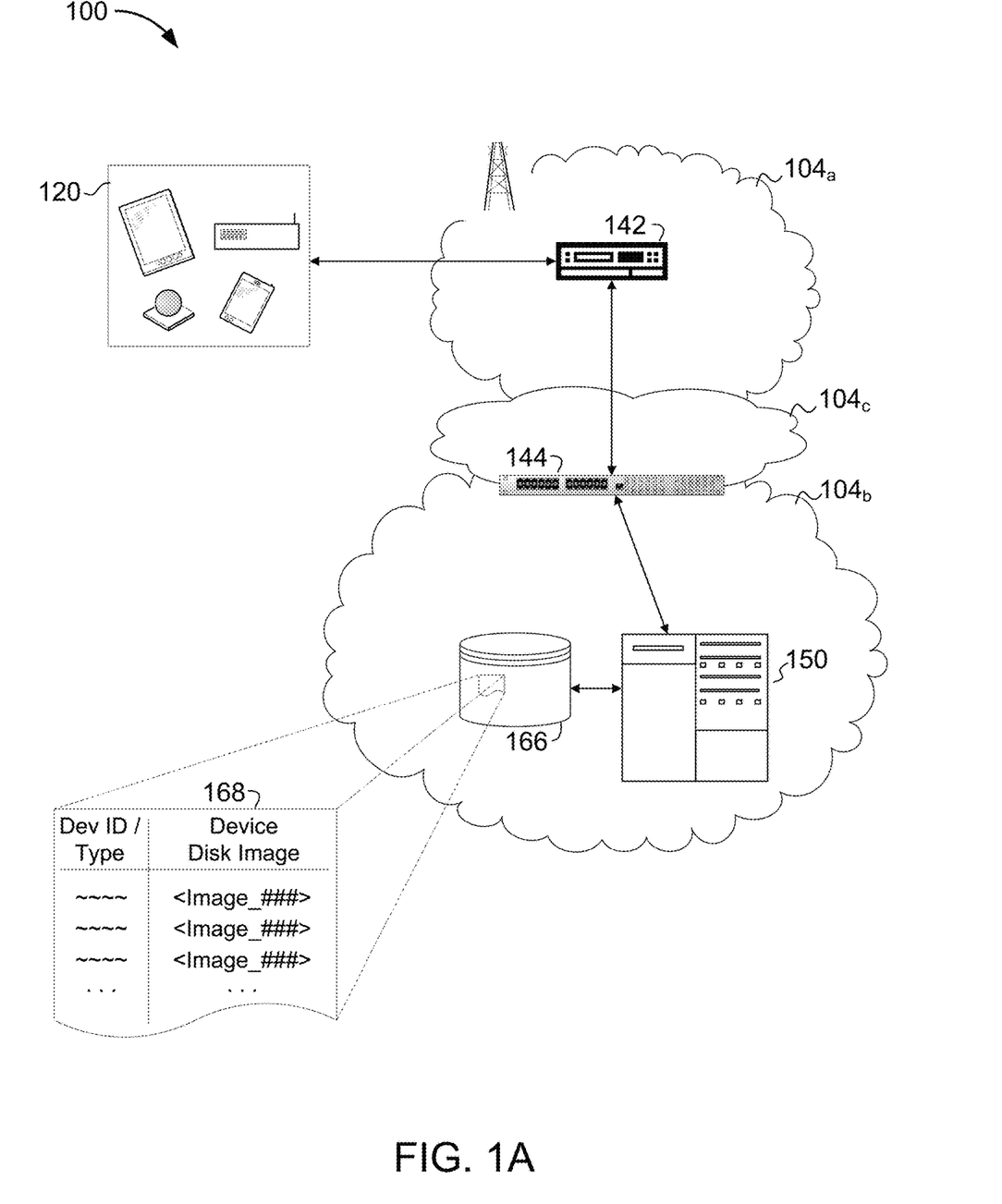
FIG. 1A is a block diagram of an illustrative network environment, in accordance with an illustrative embodiment.

FIG. 1A depicts an illustrative network environment 100, in accordance with an illustrative embodiment. The network environment 100 includes a deployment network $104_a$, a production network $104_b$, and one or more other networks such as a transit network $104_c$ (the deployment network $104_a$, the production network $104_b$, and the transit network $104_c$ are referred to generally as networks 104). Within the network environment 100, client devices 120 (e.g., Internet of Things ("IoT") devices) communicate with servers 150, and the servers 150 provide one or more network services to the client devices 120. As shown in FIG. 1A, servers 150 are situated in the production network $104_b$. The client devices 120 communicate with the servers 150 via the deployment network $104_a$ which may pass data directly to the production network $104_b$ or pass data through one or more intermediary networks, e.g., through the transit network $104_c$. Network communications between the client devices 120 and the servers 150 flow through network devices 144 such as switches, routers, hubs, filters, firewalls, gateways, and so forth. For example, the deployment network $104_a$ includes an access point 142 that directs traffic from client devices 120 to the servers 150 (e.g., via network device 144). The servers 150 include a device disk image host server 150 configured to supply disk images to client devices 120, e.g., as described herein. In some embodiments, the device disk image host server 150 sources these disk images from a data storage system 166. The stored data 168 may include, for example, an association of device identifiers (or device types) paired with corresponding device disk images. As described in more detail below, the device disk image host server 150 may receive a disk image request from a client device 120, use the data storage system 166 to identify a suitable disk image from the stored data 168, and return the identified disk image to the requesting client device 120.

Suitable examples of client devices 120 include various processor-based devices that execute instructions for interactions with servers 150 via a network 104. Some example client devices 120 are "Internet of Things" ("IoT") devices. For example, some example client devices 120 are passive monitoring devices such as thermometers, hydrometers, barometers, smoke detectors, light sensors, and the like. Some example client devices 120 receive input from a user and/or present output to the user. For example, the client device 120 may be any kind of computing device, including, e.g., a desktop computer, a laptop or notepad computer, a thin client, a mobile device such as a tablet or electronic "pad," a smart phone or data phone, a "smart" watch or other wearable, a gaming system, an Internet Radio, or any other device capable of the functions described herein. The client devices 120 are capable of exchanging information with other computing devices via a network 104 (e.g., via the deployment network $104_a$). For example, a client device 120 may exchange information over the network 104 using protocols in accordance with the Open Systems Interconnection ("OSI") layers, e.g., using an OSI layer-4 transport protocol such as the User Datagram Protocol ("UDP") or the Transmission Control Protocol ("TCP"), layered over an OSI layer-3 network protocol such as Internet Protocol ("IP"), e.g., IPv4 or IPv6. In some embodiments, the client device 120 supports network communication using Secure Socket Layer ("SSL") or Transport Layer Security ("TLS"), which encrypts communications layered over a reliable transport protocol (such as TCP). In some embodiments, the client device 120 is a thin-client, or functions as a thin-client, executing a thin-client protocol or remote-display protocol such as the Independent Computing Architecture ("ICA") protocol created by Citrix Systems, Inc. of Fort Lauderdale, Fla. The ICA protocol allows presentation at the client device 120 of software executing remotely (e.g., at a server 150), as though the remotely executed software were executed locally on the client device 120. In some embodiments, one or more of the servers 150 with which the client devices 120 communicate supports a custom instruction set, e.g., an application programming interface ("API"), and a custom application executed on the client device 120 implements the API. An application can implement an API using, for example, a library such as a dynamic link library ("DLL") or a software development kit ("SDK") provided to the application's developer.

Figure 1B:
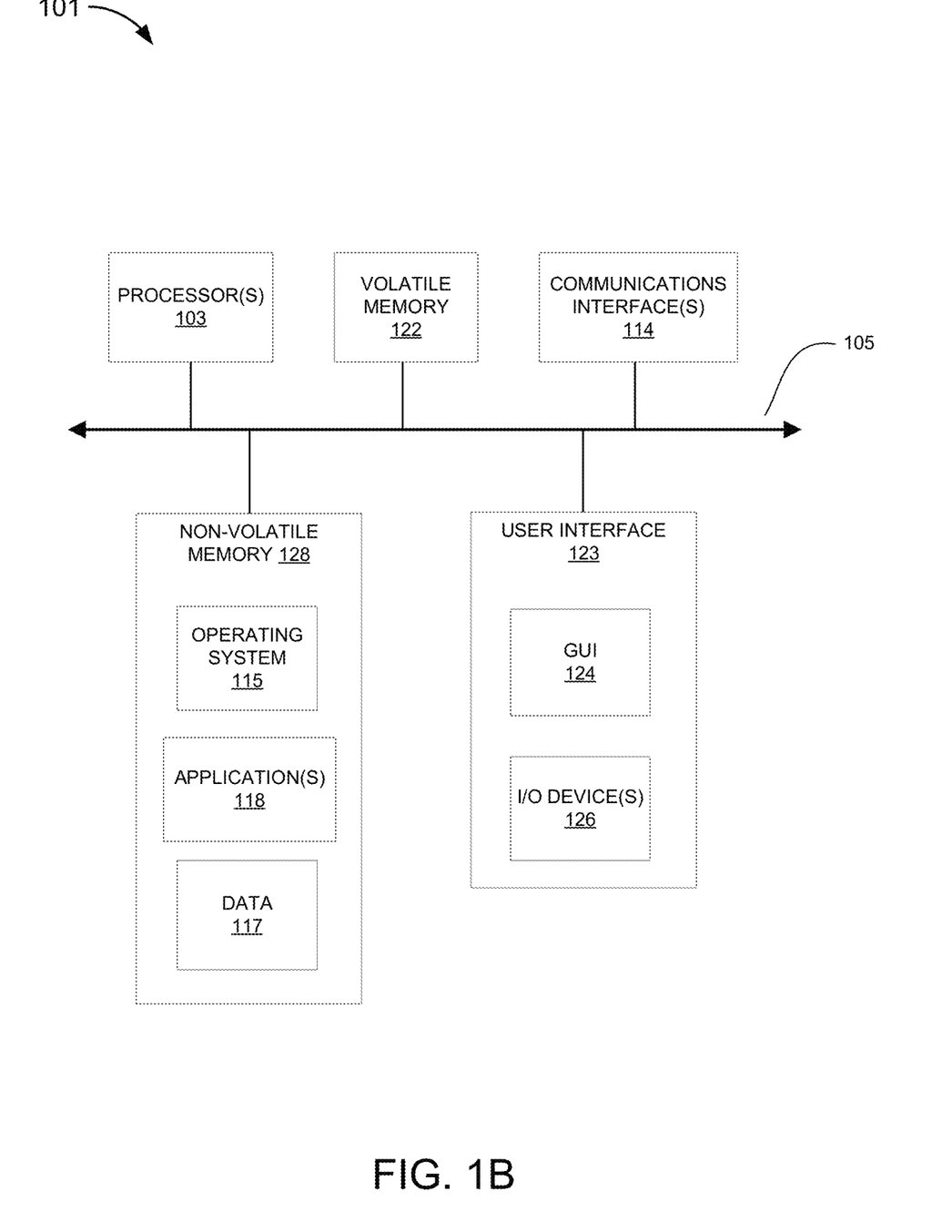
FIG. 1B is a block diagram of an example computing device, in accordance with an illustrative embodiment.

In some embodiments, the client device 120 includes one or more hardware elements for facilitating data input and data presentation. In some embodiments, the client device 120 is implemented using special purpose logic circuitry, e.g., an application specific integrated circuit ("ASIC"). In some embodiments, the client device 120 is implemented using a system on a chip ("SoC") semiconductor device that includes at least one processor (or microprocessor) core. In some embodiments, the client device 120 is implemented using a general purpose computing processor. FIG. 1B, described in more detail below, illustrates a computing device 101 that, in some configurations, is suitable for use as a client device 120.

The networks $104_a$, $104_b$, and $104_c$ (referred to generally as a network 104) link devices for communication. In some embodiments, data flows through the network 104 as a flow of data packets in accordance with the OSI layers, e.g., as a TCP or ICA flow. An illustrative network 104 is the Internet; however, other networks may be used. Each network $104_a$, $104_b$, and $104_c$ may be an autonomous system ("AS"), i.e., a network that is operated under a consistent unified routing policy (or at least appears to from outside the AS network) and is generally managed by a single administrative entity (e.g., a system operator, administrator, or administrative group). A network 104 may be composed of multiple connected sub-networks or AS networks. Networks may include one or more network devices 144 propagating data through the network. Networks meet at boundary nodes, e.g., gateway nodes, routers, or multi-homed computing devices. A network 104 may include wired links, optical links, and/or radio links. A network 104 may include a telephony network, including, for example, a wireless telephony network implementing a wireless communication protocol such as the Global System for Mobile Communications ("GSM"), Code Division Multiple Access ("CDMA"), Time Division Synchronous Code Division Multiple Access ("TD-SCDMA"), Long-Term Evolution ("LTE"), or any other such protocol. A wireless network (such as a Wi-Fi network or a wireless telephony network) may use one or more radio receivers for access to the network. The access point 142 is an example of a network node at which the client device 120 may connected to the deployment network $104_a$. The network 104 may be public, private, or a combination of public and private networks. Each of the networks $104_a$, $104_b$, and $104_c$ may be any type and/or form of data network and/or communication network.

The network devices 144 are network nodes that forward network data (e.g., data packets) between other network nodes. Suitable examples of network devices 144 include switches, routers, hubs, multi-homed computing devices, or any other device used for network communications. A network device 144 may include two or more network interfaces (or physical "ports," which should not be confused with transport protocol ports) and logic circuitry for identifying, for particular data, an egress interface connected to another device that will move the particular data towards a destination. In some embodiments, the network devices 144 direct traffic based on routing configuration data to forward data towards traffic destinations. In some embodiments, the network devices 144 forward data according to routing tables. In some embodiments, the network devices 144 forward data according to a configuration, e.g., a configuration set by a software defined network ("SDN") controller. In some embodiments, a network device 144 includes a content-addressable memory ("CAM") or ternary content-addressable memory ("TCAM"), used in identifying egress interfaces for routing data. In some embodiments, a network device 144 implements additional network functionality, or directs traffic through additional network nodes providing network functionality. For example, a network device 144 may pass traffic through a firewall, a network address translator ("NAT"), a network filter, or some other node providing network functionality.

The access point 142 is an example network device that serves as a connection from the client device 120 to the deployment network $104_a$. Examples of an access point 142 include a wireless network base (also referred to as a "Wi-Fi hot spot"), a wired connection point (e.g., a router, switch, or hub), or any other connection point. In some embodiments, the client device 120 connects to the deployment network $104_a$ via a telephony protocol, e.g., a mobile phone data service protocol, and the access point 142 is a telephone network node. In some embodiments, the client device 120 is preconfigured to connect to a particular access point 142 (or to one of a specific set of access points 142) on start up. In some embodiments, the access point 142 is a specialized "hub" device configured specifically to receive network connection requests from specific client devices 120 (e.g., from a specific model of client device 120).

One or more servers 150 may be logically grouped (e.g., as a server farm), and may either be geographically co-located (e.g., on premises) or geographically dispersed (e.g., cloud based) from client devices 120 and/or other servers 150. In some embodiments, a server 150 or group of servers 150 executes one or more applications on behalf of one or more of client devices 120 (e.g., as an application server). In some embodiments, the servers 150 provide functionality such as, but not limited to, file server, gateway server, proxy server, or other similar server functions. In some embodiments, client devices 120 may seek access to hosted applications on servers 150. In some embodiments, a network device 144 or a server 150 may provide load balancing across multiple servers 150 to process requests from client devices 120, act as a proxy or access server to provide access to the one or more servers 150, provide security and/or act as a firewall between a client 120 and a server 150, provide Domain Name Service ("DNS") resolution, provide one or more virtual servers or virtual internet protocol servers, and/or provide a secure virtual private network ("VPN") connection from a client 120 to a server 150, such as a secure socket layer ("SSL") VPN connection and/or provide encryption and decryption operations. One particular network function is hosting device disk images. The servers 150 include a device disk image host server 150 configured to supply disk images to client devices 120, e.g., as described herein. In some embodiments, the device disk image host server 150 sources these disk images from a data storage system 166.

In described embodiments, client devices 120, network devices 144, servers 150 (including the authentication server 160), and other devices shown in FIG. 1A may be deployed as (or executed on) any type and form of computing device, such as any desktop computer, laptop computer, or mobile device capable of communication over at least one network 104 and performing the operations described herein. For example, the client devices 120, servers 150, and other devices may each correspond to one computer, a plurality of computers, or a network of distributed computers such as the computing device 101 shown in FIG. 1B.

As shown in FIG. 1B, a computing device 101 may include one or more processors 103, volatile memory 122 (e.g., RAM), non-volatile memory 128, user interface (UI) 123, one or more communications interfaces 114 (e.g., a network interface card ("NIC") and/or a radio transmitter, e.g., for Wi-Fi or NFC communications), and a communication bus 105. The user interface 123 may include hardware for a graphical user interface ("GUI") 124 (e.g., a touchscreen, a display, etc.), one or more input/output ("I/O") devices 126 (e.g., a mouse, a keyboard, a speaker, etc.). Non-volatile memory 128 stores an operating system 115, one or more applications 118, and data 117 such that, for example, computer instructions of operating system 115 and/or applications 118 are executed by processor(s) 103 out of volatile memory 122. In some embodiments, a client device 120 may be implemented without non-volatile memory 128; the elements traditionally stored in non-volatile memory 128 in such embodiments may be stored in volatile memory 122, e.g., provisioned from a server 150 as described herein. Data 117 may be entered using an input device of GUI 124 or received from I/O device(s) 126. Various elements of the computing device 101 may communicate via communication bus 105. The computing device 101 as shown in FIG. 1B is shown merely as an example, as client devices 120, servers 150 (including the authentication server 160), and other network devices 144 may be implemented by any computing or processing environment and with any type of machine or set of machines that may have suitable hardware and/or software capable of operating as described herein.

The processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more of an application specific integrated circuit ("ASIC"), microprocessor, digital signal processor, microcontroller, field programmable gate array ("FPGA"), programmable logic arrays ("PLA"), multi-core processor, or general-purpose computer processor with associated memory. The "processor" may be analog, digital, or mixed-signal. In some embodiments, the "processor" may be one or more physical processors or one or more "virtual" (e.g., remotely located or cloud-based) processors.

The non-volatile memory 128 may include one or more of a hard disk drive ("HDD"), solid state drive ("SSD") such as a Flash drive or other solid state storage media, or other magnetic, optical, circuit, or hybrid-type storage media. In some embodiments, the non-volatile memory 128 includes read-only memory ("ROM"). In some embodiments, storage may be virtualized, e.g., using one or more virtual storage volumes, such as a cloud storage, or a combination of such physical storage volumes and virtual storage volumes. In some embodiments, a client device 120 may be implemented without non-volatile memory 128; the elements traditionally stored in non-volatile memory 128 in such embodiments may be stored in volatile memory 122, e.g., provisioned from a server 150 as described herein.

The communications interface 114 may include one or more interfaces to enable the computing device 101 to access a computer network 104 such as a LAN, a WAN, or the Internet through a variety of wired and/or wireless or cellular connections. In some embodiments, the communications interface 114 includes one or more network connection points (ports) and an interface controller. Network connection points may be wired connection points (e.g., Ethernet ports) or wireless (e.g., radio circuitry for Wi-Fi or mobile network communications).

Figure 1C:
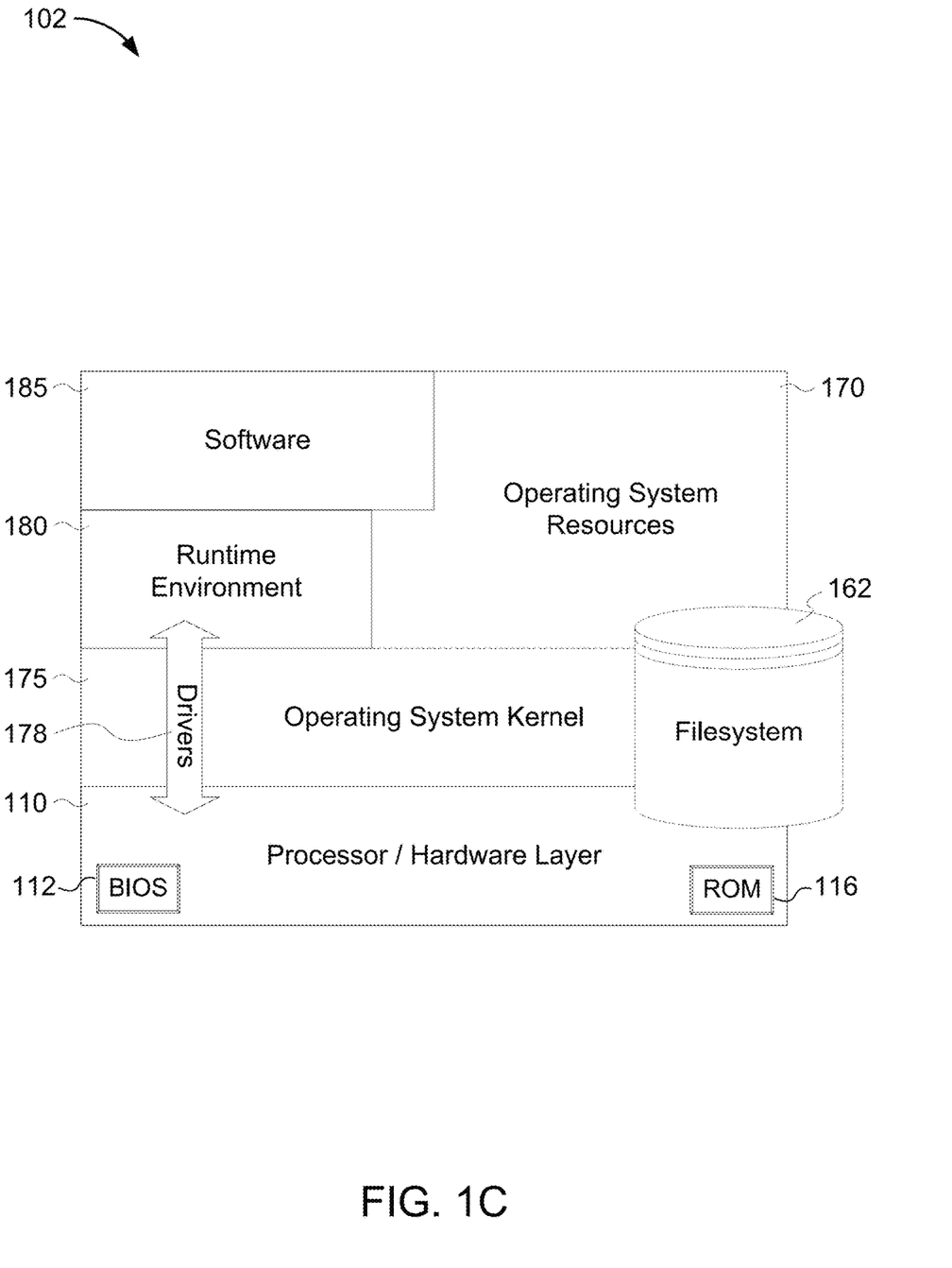
FIG. 1C is a block diagram of an example computing device execution environment, in accordance with an illustrative embodiment.

FIG. 1C is a block diagram of an example computing device execution environment 102, in accordance with an illustrative embodiment. The environment 102 includes the processor/hardware layer 110 of an example computing device 101 (e.g., a client device 120 or server 150) and the software instructions run by the processor/hardware layer 110. In brief overview, the processor/hardware layer 110 includes a basic input/output system ("BIOS") 112 hard-coded in a restricted circuit that is either read-only memory ("ROM") 116 or a re-writeable memory that can only be rewritten using a secured instruction set. The BIOS 112 is immutable, or functionally immutable. In addition to the BIOS 112, the processor/hardware layer 110 may include a ROM 116 encoded with a boot-up process for connecting to a network access point 142 and requesting a device disk image from a server 150. The environment 102 includes an operating system kernel 175 that provides operating system resources 170 such as device drivers 178. In some embodiments, the operating system provides for management of a filesystem 162. The operating system facilitates execution of software 185 on the processor/hardware layer 110. In some embodiments, the operating system may provide one or more virtualization or emulation layers between the software 185 and the processor/hardware layer 110. In some embodiments, software 185 may be written or compiled in a form requiring a runtime environment 180. For example, software 185 written in JAVA may be compiled into JAVA bytecode suitable for execution in a java virtual machine ("JVM") represented in FIG. 1C as the runtime environment 180. As described herein, the device disk image provided to a client device 120 by the server 150 may include all of the instructions needed for the client device 120 to run the operating system and software over the processor/hardware layer 110.

Figure 2:
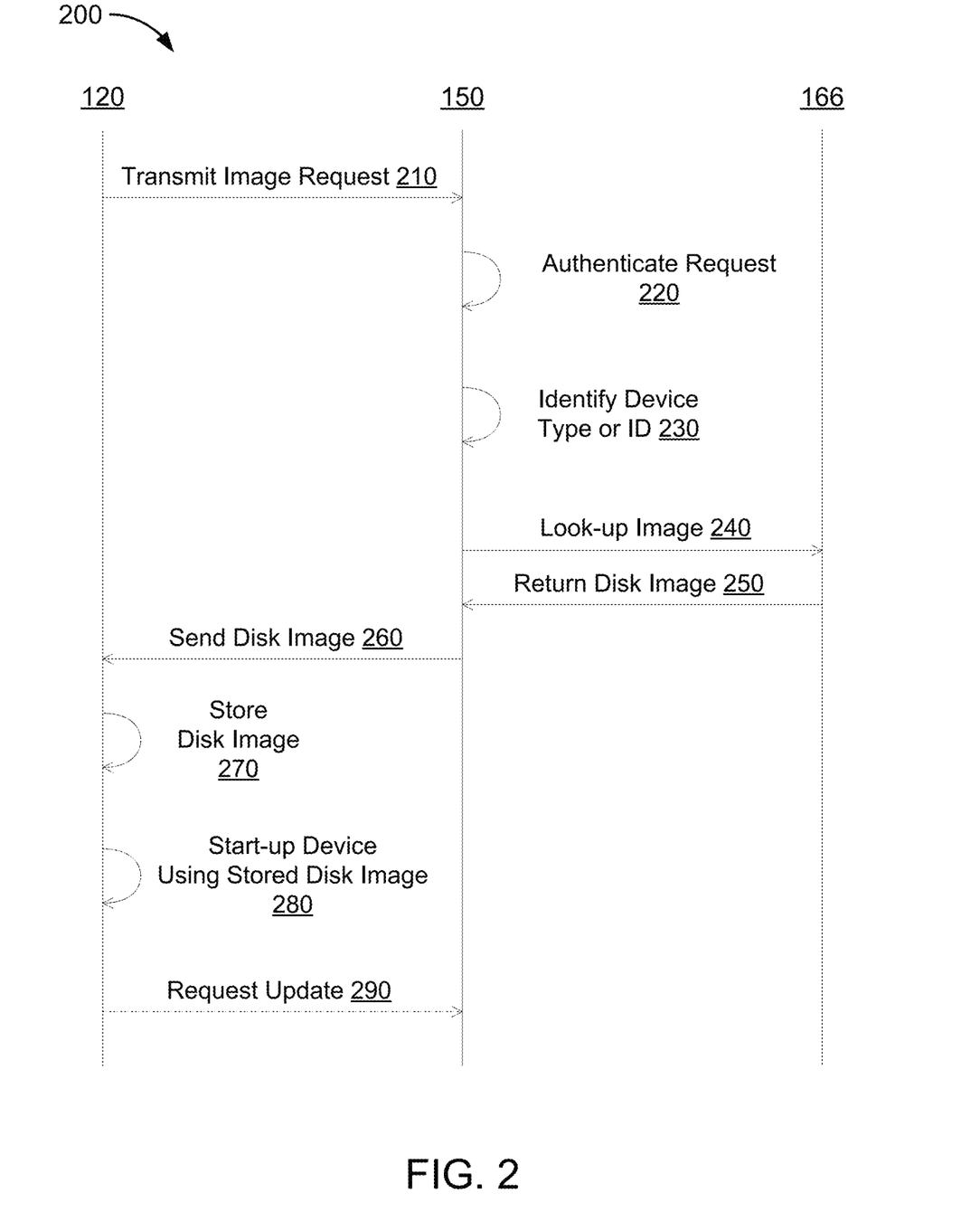
FIG. 2 is a ladder diagram for data exchanges used in an illustrative embodiment.

FIG. 2 is a ladder diagram for an example data exchange 200 used in an illustrative embodiment. As shown in FIG. 2, a client device 120 transmits 210 an image request to a server 150. The server 150 authenticates 220 the request and identifies 230 the device type or device identifier for the device making the request. Authentication 220 and device identification 230 may be performed by the server 150 in any order and/or in parallel. The server 150 looks-up 240 the image, e.g., from a data storage system 166. For example, the server 150 may request a database search from the data storage system 166. The data storage system 166 then returns 250 a disk image and the server 150 sends 260 the disk image back to the requesting client device 120. The client device 120 stores 270 the disk image and boots 280 the device using the stored disk image. In some embodiments, the client device 120 may periodically request 290 an update of the disk image, effectively repeating the exchange 200.

Figure 3:
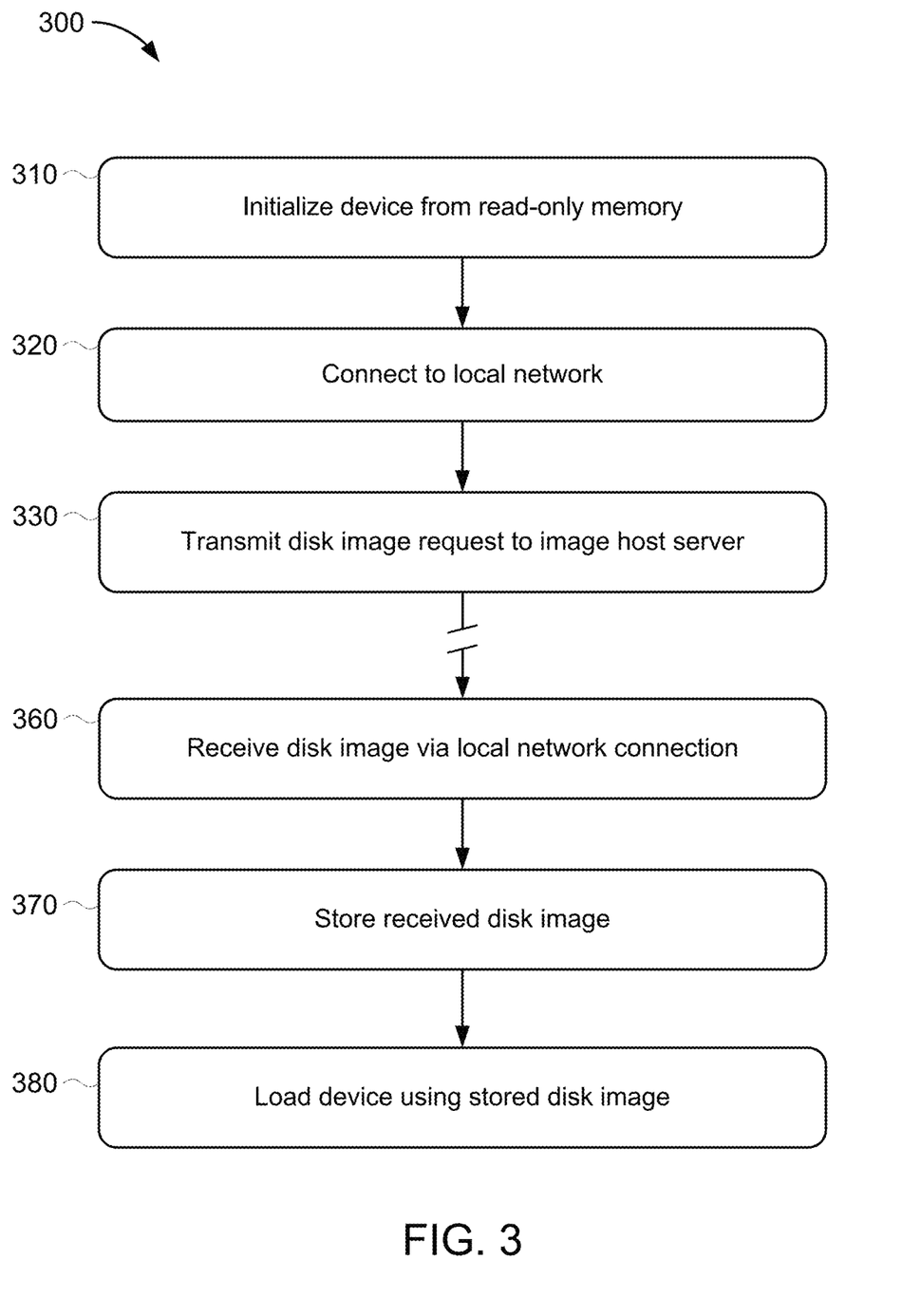
FIG. 3 is a flowchart for an example method of booting a device absent a device-local disk image.

FIG. 3 is a flowchart for an example method 300 of booting a device absent a device-local disk image. In broad overview of the method 300, at stage 310, the device (e.g., a client device 120) initializes itself from read-only memory (e.g., from a BIOS 112 or other ROM 116). At stage 320, the device connects to a local network (e.g., a deployment network $104_a$ in which the device is deployed). For example, in some embodiments, the device connects to the local network at stage 320 using pre-configured instructions, e.g., from the BIOS 112 or ROM 116. At stage 330, the device transmits a disk image request to a disk image host server (e.g., a server 150). The disk image host server will identify and return a disk image suitable for use by the device. At stage 360, the device receives the disk image via the local network connection. At stage 370, the device stores the received disk image and, at stage 380, loads or boots the device using the stored disk image. In some embodiments, the device will periodically repeat the method 300, starting from stage 320 or from stage 330, to refresh the stored disk image with a replacement image.

Referring to FIG. 3 in more detail, at stage 310, the device (e.g., a client device 120) initializes itself from read-only memory (e.g., from a BIOS 112 or other ROM 116). In some embodiments, the BIOS 112 and/or ROM 116 contain enough information to perform the method 300.

At stage 320, the device connects to a local network (e.g., an access point 142 for a deployment network 104$_a$ in which the device is deployed). For example, in some embodiments, the device connects to the local network at stage 320 using pre-configured instructions, e.g., from the BIOS 112 or ROM 116. In some embodiments, the device is pre-configured with a set of possible networks that it can connect to (e.g., for automated network discovery). In some embodiments, the device is pre-configured with a set of identifiers for acceptable access points 142. In some embodiments, the access point 142 is a specialized device configured to accept network join requests from the device. In some embodiments, the device joins any available open network. In some embodiments, the device joins any available Wi-Fi network. In some embodiments, the device joins any available network and applies a sequence of passwords until it successfully connects to a network. The sequence of passwords may be stored in an immutable form, e.g., in the ROM 116.

At stage 330, the device transmits a disk image request to a disk image host server (e.g., a server 150). The disk image host server will identify and return a disk image suitable for use by the device. In some embodiments, the disk image host server is at a pre-configured network address. In some embodiments, the pre-configured network address is one of a list of network addresses stored in an immutable form by the device, e.g., in ROM 116, and the device is configured to iterate through the list until successfully interacting with the server. In some such embodiments, the list of network addresses includes at least one fixed network address in an internet protocol ("IP") version 4 ("IPv4") or version 6 ("IPv6") format. In some embodiments, the list of network addresses includes at least one uniform resource locator ("URL") that resolves, by dynamic name server ("DNS") look-up, to the server.

In some embodiments, the device establishes a secure communication channel with the server, e.g., a virtual private network ("VPN"), a secure socket layer ("SSL"), or HTTPS. In some embodiments, the device pings the server and the server responds with a standard or custom protocol handshake to establish the secure communication channel. In some embodiments, communication proceeds without establishing a secure communication channel.

In some embodiments, the request at stage 330 includes an authentication token or other proof of authenticity. The server is configured to authenticate the request based on the authentication token or proof of authenticity. In some embodiments, the request includes a security credential, e.g., an encrypted token. In some embodiments, the server will respond to the request at stage 330 with a challenge and the device responds to the challenge to prove authenticity. In some embodiments, the server generates a challenge, sends the challenge back to the device, receives a response to the challenge from the device, and authenticates the request based on the challenge response. An example of a challenge and challenge response is for the server to encrypt a random number using a first secret key and require the device to respond with the same random number either decrypted or encrypted using a second secret key. The encryption may use shared keys (where the device and the server both have the same secret key) or use a pair of keys (e.g., an asymmetrical encryption scheme where one key in the pair is used to decrypt content encrypted using the other key in the pair). In some embodiments, each device has a deterministic sequence generator (e.g., a linear feedback shift register, "LFSR") and sends the next number in the sequence with each request. The server authenticates the request if the included LFSR sequence number is correct. In some such embodiments, the device encrypts the LFSR sequence number, e.g., using a shared key (or a one time key). In some embodiments, the server tolerates one or more skipped numbers in the LFSR sequence, e.g., to accommodate missed requests. Other authentication sequences may likewise be used.

At stage 360, the device receives the disk image via the local network connection. In some embodiments, the server sends the disk image to the device directly. In some embodiments, the server sends the device a pointer to the disk image, e.g., a uniform resource locator ("URL"), and the device obtains the disk image by fetching it from the pointed-to location.

At stage 370, the device stores the received disk image. In some embodiments, the device writes the received disk image to non-volatile memory 128. In some embodiments, the device writes the received disk image to volatile memory 122.

In some embodiments, the device validates the received disk image. Just as the server authenticates the request, the device authenticates the server and the data supplied by the server. In some embodiments of the system, the device includes a cryptographic certificate for validating disk images, and the device is configured to validate the disk image using the cryptographic certificate. For example, the disk image may include a hash of the disk image encrypted with a private key held by a signing authority and the certificate includes a corresponding public key. The device uses the public key to decrypt the hash and then compares the decrypted hash to a hash of the received disk image. If they match, the device may determine that the disk image is valid.

At stage 380, the device loads or boots the device using the stored disk image. In some embodiments, the device mounts the memory element storing the disk image as a primary data device (e.g., a main drive). In some embodiments, the device starts an operating system encoded in the disk image. In some embodiments, the device executes instructions included in the disk image to create an execution environment 102.

In some embodiments, the device will periodically repeat the method 300, starting from stage 320 or from stage 330, to refresh the stored disk image with a replacement image. For example, in some embodiments, the device is configured to replace or refresh the disk image at regular intervals (e.g., every hour, every four hours, every eight hours, every twelve hours, every twenty-four hours, every week, every month, etc.). In some embodiments, the device generates a signature for the provisioned disk image (e.g., a hash of the disk image, or a hash combined with metadata such as a last provisioned timestamp) and sends the signature to the device disk image host server with the disk image request. The server may then analyze the signature to determine if a new disk image should be provisioned. For example, if the hash doesn't match a hash of the corresponding disk image at the server end and/or if the timestamp exceeds a threshold max runtime for a provisioned image. If the analysis indicates that a new disk image should be sent, the server then transmits the disk image and the device continues with stage 360 receiving the image. It overwrites the previously provisioned image and restarts or reloads from the newly provisioned image. In some embodiments, the server always sends a new disk image without such analysis.

Figure 4:
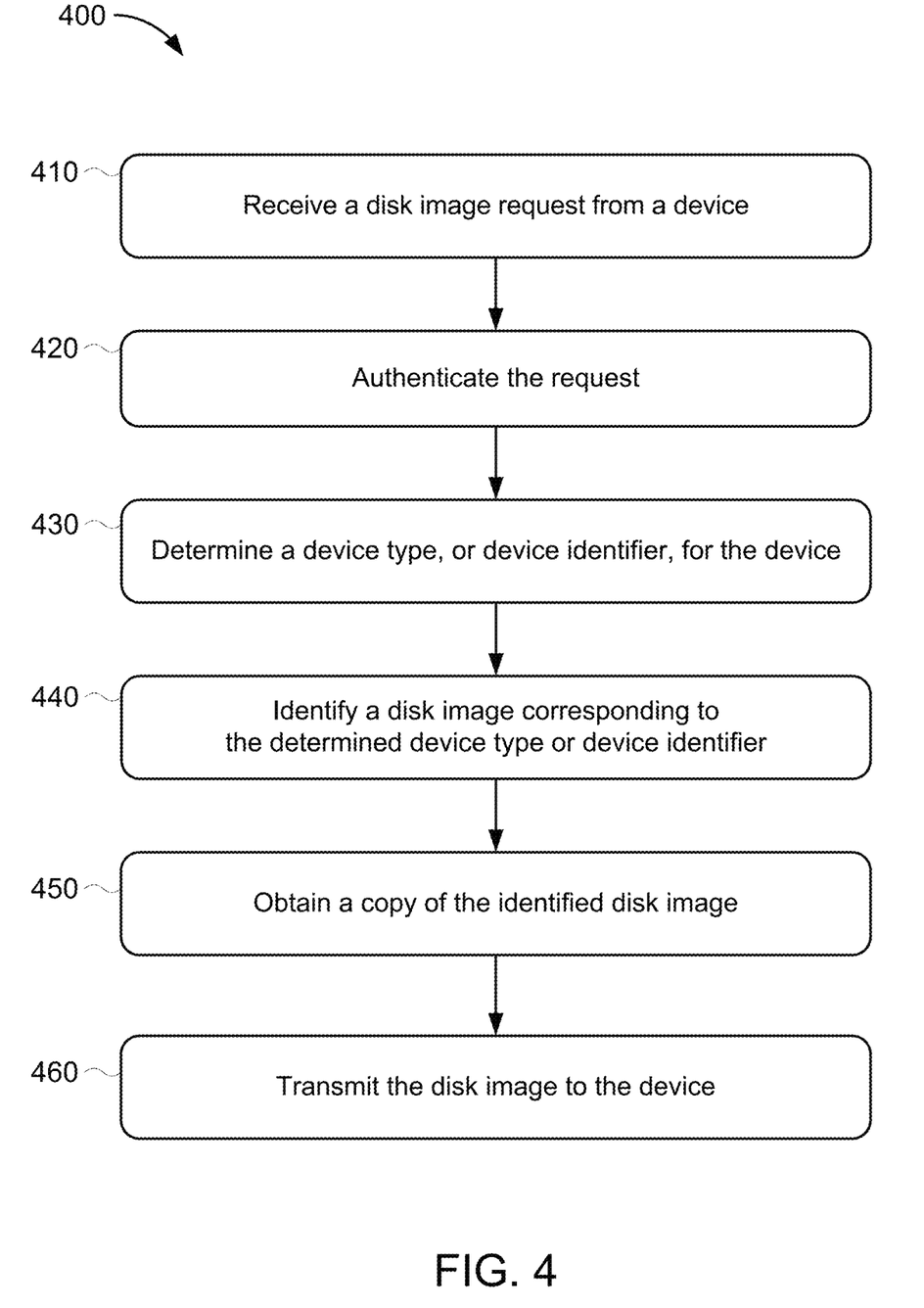
FIG. 4 is a flowchart for an example method of provisioning a disk image on a remote device.

FIG. 4 is a flowchart for an example method 400 of provisioning a disk image on a remote device. In broad overview of the method 400, at stage 410, the server (e.g., a device disk image host server such as a server 150) receives a disk image request from a device (e.g., a client device 120). At stage 420, the server authenticates the request and at stage 430 determines a device type, or device identifier, for the device. At stage 440, the server identifies a disk image corresponding to the determined device type or device identifier and at stage 450 obtains a copy of the identified disk image. At stage 460, the server (or another data server, e.g., a cache, operating at the direction of the server) transmits the disk image to the device.

Referring to FIG. 4 in more detail, at stage 410 the server (e.g., a device disk image host server such as a server 150) receives a disk image request from a device (e.g., a client device 120). In some embodiments, the request is an initialization request. In some embodiments, the request is a refresh request. In some embodiments, the request includes an a credential for authentication, e.g., an identifier and password pair or an authentication token. In some embodiments, the request includes a timestamp. In some embodiments, the request is submitted in a secured session, e.g., as an HTTPS request.

At stage 420, the server authenticates the request. In some embodiments, the request includes a security credential, e.g., an encrypted token. In some embodiments, the server generates a challenge, sends the challenge back to the device, receives a response to the challenge from the device, and authenticates the request based on the challenge response. An example of a challenge and challenge response is for the server to encrypt a random number using a first secret key and require the device to respond with the same random number either decrypted or encrypted using a second secret key. The encryption may use shared keys (where the device and the server both have the same secret key) or use a pair of keys (e.g., an asymmetrical encryption scheme where one key in the pair is used to decrypt content encrypted using the other key in the pair). In some embodiments, each device has a deterministic sequence generator (e.g., a linear feedback shift register, "LFSR") and sends the next number in the sequence with each request. The server authenticates the request if the included LFSR sequence number is correct. In some such embodiments, the device encrypts the LFSR sequence number. In some embodiments, the server tolerates one or more skipped numbers in the LFSR sequence, e.g., to accommodate missed requests. Other authentication sequences may likewise be used.

At stage 430, the server determines a device type, or device identifier, for the device. In some embodiments, stage 430 happens before, or concurrently with, stage 420. At stage 430, the server determines the information needed to look-up the correct corresponding device disk image. In some embodiments, this information is a device-specific implementation unique identifier, corresponding to only one deployed device (e.g., in some embodiments, the device disk image is unique to specific devices). For example, in some such implementations, the server uses one or more of a network address (e.g., an IPv4 or IPv6 address) for the device, uses a media access controller ("MAC") address for the device, uses an assigned number included in the request (e.g., a unique serial number encoded in ROM 116), or some combination thereof. In some implementations, the device disk image is generalized to a set of devices of the same type. For example, in some such implementations, any device of the same type (e.g., a particular model of IoT sensor or controller) can use the same disk image. In some such implementations, the server first identifies the specific device and then looks up the type for the identified device, e.g., from a mapping. In some implementations, the server identifies the device type without uniquely identifying the device.

At stage 440, the server identifies a disk image corresponding to the determined device type or device identifier. Based on the device type or device identifier, the server identifies a corresponding device disk image. In some embodiments, the server uses a data storage system 166 to identify a device disk image from data 168 stored in the system 166. In some embodiments, the server queries a database. In some embodiments, the server consults a look-up table. In some embodiments, the server performs the look-up in a cache. In some such embodiments, if the requested disk image isn't in cache, the server then falls back to a secondary search. In some embodiments, the look-up results in a pointer to a disk image, e.g., a uniform resource locator ("URL"). In some embodiments, the look-up results in a file name.

At stage 450, the server obtains a copy of the identified disk image and at stage 460, the server (or another data server, e.g., a cache, operating at the direction of the server) transmits the disk image to the device. In some embodiments, the server fetches the disk image from a data storage device 166. In some embodiments, the server skips step 450. For example, if the disk image is available at a URL, the server may return the URL to the device and the device then fetches the image from the URL. In some embodiments, the server causes another server to transmit the device disk image to the device.

The systems and methods described may be used in a variety of embodiments. For example, and without limitation:

In at least one aspect, the above describes a system for provisioning disk images on remote devices. The system includes a device having a volatile memory component, a processor configured to execute instructions from the volatile memory component, and a network interface controller configured to connect to a pre-configured network upon device start-up, transmit a request to to server at a pre-configured network address, receive a response containing a disk image for the device, and populate the volatile memory component with the disk image received. The system further includes a server configured to, responsive to receiving the request from the device, authenticate the request, identify the disk image corresponding to the device, and transmit the disk image to the device.

In some embodiments, the system includes a data storage device storing one or more disk images for the remote devices. The server is configured to identify the disk image from the data storage device based on either a device identifier specific to the device or a device type corresponding to the device. In some embodiments, the device is configured to periodically request, from the server, a refresh of the disk image, receive a replacement disk image, and populate the volatile memory component with the replacement disk image received. Populating the volatile memory component with the replacement disk image replaces any previously received disk image.

In some embodiments of the system, the disk image includes an operating system for the device and software to be executed by the device. In some such embodiments, the device is configured to boot the operating system from the volatile memory component after populating the volatile memory component with the disk image received responsive to the request.

In some embodiments of the system, the pre-configured network address is one of a list of network addresses stored in an immutable form by the device, and the device is configured to iterate through the list until successfully interacting with the server. In some such embodiments, the list of network addresses includes at least one fixed network address in an internet protocol ("IP") version 4 ("IPv4") or version 6 ("IPv6") format. In some embodiments, the list of network addresses includes at least one uniform resource locator ("URL") that resolves, by dynamic name server ("DNS") look-up, to the server.

In some embodiments of the system, the device includes a cryptographic certificate, and the device is configured to validate the disk image using the cryptographic certificate. In some embodiments, the request includes an authentication token and the server is further configured to authenticate the request based on the authentication token.

In some embodiments, the server is configured to identify the disk image corresponding to the device by: identifying, from the request, a media access control ("MAC") address for the device, identifying a device type based on the MAC address for the device, and identifying a disk image corresponding to the identified device type. In some embodiments, the server is configured to identify the disk image corresponding to the device by querying a database mapping a device identifier to the disk image. In some embodiments, the device identifier is a media access control ("MAC") address for the device. In some embodiments, the server is configured to identify the MAC address from the request.

In some embodiments of the system, one or more processors in the server are configured to execute instructions encoded on non-transitory computer-readable media.

In at least one aspect, the above describes a method of provisioning a disk image on a remote device. The method includes receiving, by a server from a device, a request for a disk image suitable for operation of the device. The method includes authenticating, by the server, the request, and identifying a disk image corresponding to the device. The method includes transmitting the identified disk image to the device responsive to the request.

In some embodiments of the method of provisioning a disk image, the disk image includes an operating system for the device and software to be executed by the device.

In some embodiments of the method of provisioning a disk image, the server identifies, from the request, a media access control ("MAC") address for the device; identifies a device type based on the MAC address for the device; and identifies a disk image corresponding to the identified device type. In some embodiments, the server identifies the disk image corresponding to the device by querying a database mapping a device identifier to the disk image. In some embodiments, the device identifier is a media access control ("MAC") address for the device. In some embodiments of the method, the server identifies the MAC address from the request. In some embodiments, the request includes an authentication token, and the server authenticates the request based on the authentication token.

In at least one aspect, the above describes a method of booting a device absent a device-local disk image. The method includes transmitting, by a device during an initialization or boot-up phase, to a pre-configured network address corresponding to a server, a request for a disk image suitable for operation of the device. The method includes receiving the disk image from the server and populating a memory element of the device with the received disk image, the disk image including operation code for the device. The method includes executing the operation code for the device, from disk image stored in the memory element of the device.

Some embodiments of the method of booting the device include validating the received disk image using a cryptographic certificate stored in an immutable form at the device.

Some embodiments of the method of booting the device include mounting the memory element of the device as a primary data storage device.

Some embodiments of the method of booting the device include transmitting, to the server, a second request to refresh the memory element of the device; receiving a replacement disk image responsive to the second request; populating the memory element of the device with the received replacement disk image; and reinitializing the device using the replacement disk image. In some such embodiments, the replacement disk image is a revised disk image. In some embodiments, the device transmits the second request responsive to a predetermined amount of time having elapsed. In some embodiments, the second request includes an identifier of the provisioned disk image. In some such embodiments, the identifier includes a hash of the provisioned disk image.

In at least one aspect, these methods may be encoded as computer-readable instructions for execution by one or more processors. The computer-readable instructions can be encoded on non-transitory computer-readable media. The computer-readable instructions can be encoded in read-only memory.

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

I claim:

1. A system for provisioning disk images on remote devices, the system comprising:
   a device comprising:
   a volatile memory component;
   a non-volatile memory component;
   a processor configured to execute instructions from at least one of the non-volatile memory component and the volatile memory component; and
   a network interface controller configured to:

connect to a pre-configured network upon device start-up from the non-volatile memory component, transmit periodically, to a server at a pre-configured network address in the pre-configured network, a request to refresh the volatile memory component, the request including an authentication token, receipt of the request causing the server to authenticate the request based on the authentication token, receive, from the server responsive to the authentication of the request, a response including a disk image identified for the device, and populate the volatile memory component with the disk image to reinitialize the device.

2. The system of claim 1, wherein the disk image includes an operating system for the device and software to be executed by the device.

3. The system of claim 2, wherein the device is configured to boot the operating system from the volatile memory component after populating the volatile memory component with the disk image received responsive to the request.

4. The system of claim 1, wherein the pre-configured network address is one of a list of network addresses stored in an immutable form by the device, and wherein the device is configured to iterate through the list until successfully interacting with the server.

5. The system of claim 4, wherein the list of network addresses includes at least one fixed network address in an internet protocol ("IP") version 4 ("IPv4") or version 6 ("IPv6") format.

6. The system of claim 4, wherein the list of network addresses includes at least one uniform resource locator ("URL") that resolves, by dynamic name server ("DNS") look-up, to the server.

7. The system of claim 1, wherein the device includes a cryptographic certificate, and the device is configured to validate the disk image using the cryptographic certificate.

8. The system of claim 1, wherein the server is configured to identify the disk image corresponding to the device by:
identifying, from the request, a media access control ("MAC") address for the device;
identifying a device type based on the MAC address for the device; and
identifying the disk image corresponding to the identified device type.

9. The system of claim 1, wherein the server is configured to identify the disk image corresponding to the device by querying a database mapping a device identifier to the disk image.

10. The system of claim 9, wherein the device identifier is a media access control ("MAC") address for the device, the server further configured to identify the MAC address from the request.

11. A method of provisioning disk images on remote devices, the method comprising:
receiving periodically, by a server from a device responsive to start-up from a non-volatile memory component of the device, a request to refresh a volatile memory component of the device, the request including an authentication token;
authenticating, by the server, the request from the device using the authentication token;
identifying, by the server responsive to authenticating the request, a disk image corresponding to the device; and
transmitting, by the server to the device, the disk image for storage on the volatile memory component to reinitialize the device.

12. The method of claim 11, wherein the disk image includes an operating system for the device and software to be executed by the device.

13. The method of claim 11, further comprising:
identifying, from the request, a media access control ("MAC") address for the device;
identifying a device type based on the MAC address for the device; and
identifying the disk image corresponding to the identified device type.

14. The method of claim 11, further comprising identifying the disk image corresponding to the device by querying a database mapping a device identifier to the disk image.

15. The method of claim 14, wherein the device identifier is a media access control ("MAC") address for the device, the method further comprising identifying the MAC address from the request.

16. A method of booting absent a device-local disk image, the method comprising:
transmitting periodically, by a device during an initialization or boot-up phase from a non-volatile memory component of the device, to a pre-configured network address corresponding to a server, a request to refresh a volatile memory component of the device, the request including an authentication token, receipt of the request causing the server to authenticate the request based on the authentication token;
receiving, by the device from the server responsive to authenticating the request, a disk image identified by the server for the device;
populating, by the device, the volatile memory component of the device with the received disk image to reinitialize the device, the disk image including operation code for the device;
executing, by the device, the operation code of the disk image populated on the volatile memory component.

17. The method of claim 16, further comprising validating the received disk image using a cryptographic certificate stored in an immutable form at the device.

18. The method of claim 16, further comprising mounting the volatile memory component of the device as a primary data storage device.

19. The method of claim 16, wherein transmitting the request is responsive to a predetermined amount of time having elapsed.

* * * * *